June 11, 1957
M. E. AMBLARD ET AL
2,795,195
HIGH PRESSURE PUMPING METHOD
Filed June 3, 1953
3 Sheets-Sheet 1
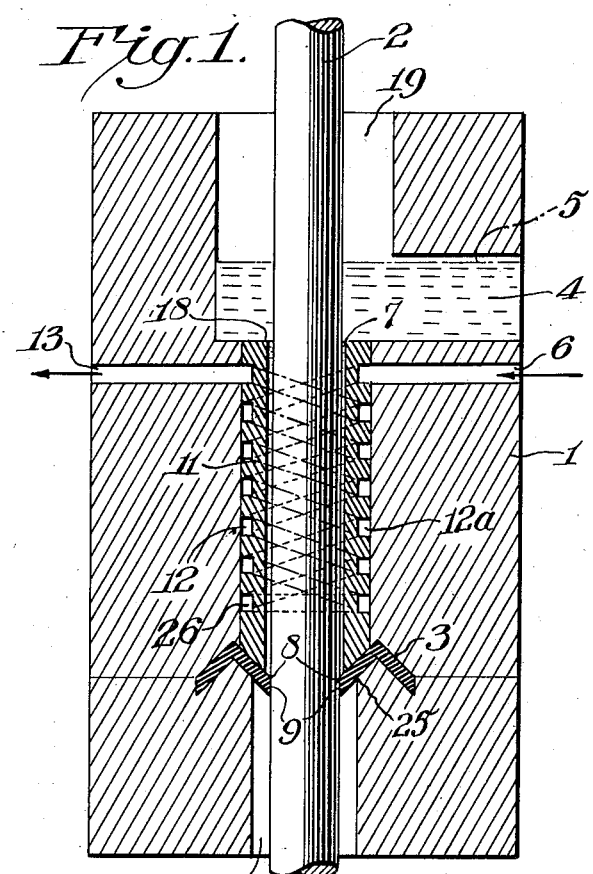
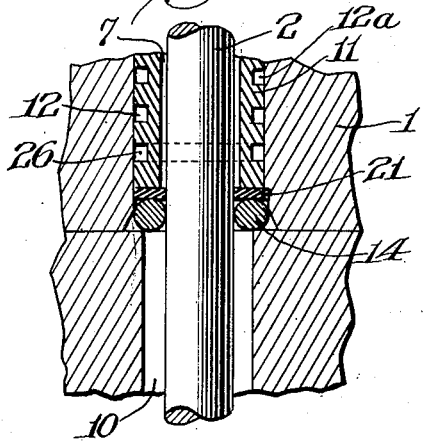
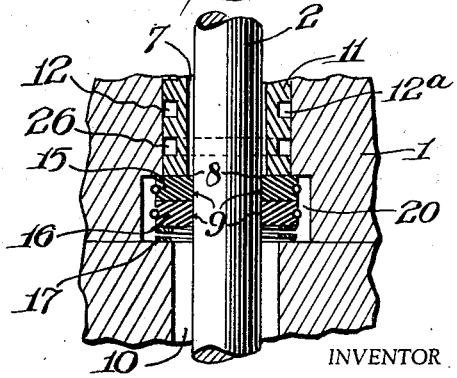
INVENTOR
Marcel Eugene Amblard
Richard Babington Winn
BY
ATTORNEY

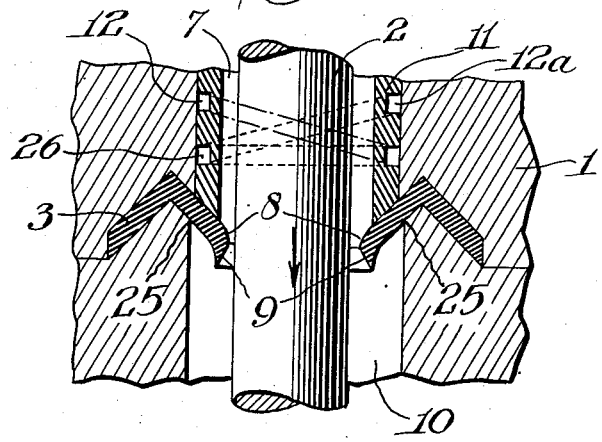
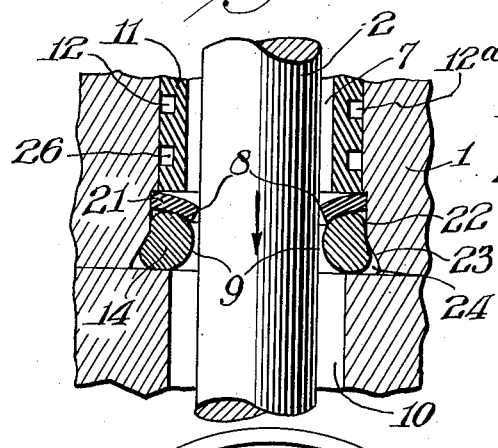
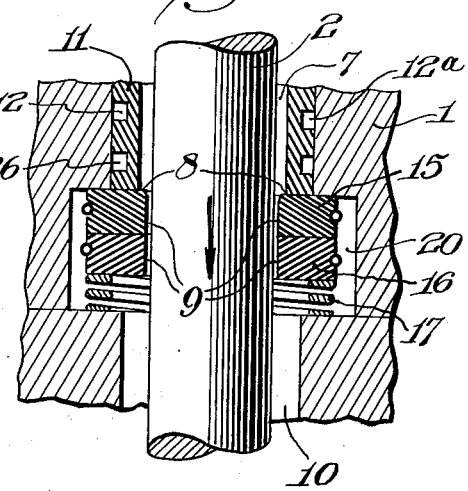
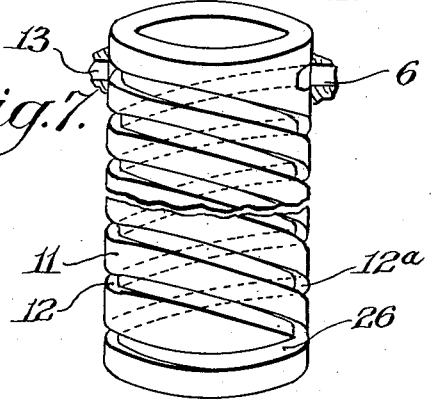

June 11, 1957  M. E. AMBLARD ET AL  2,795,195
HIGH PRESSURE PUMPING METHOD
Filed June 3, 1953  3 Sheets-Sheet 3
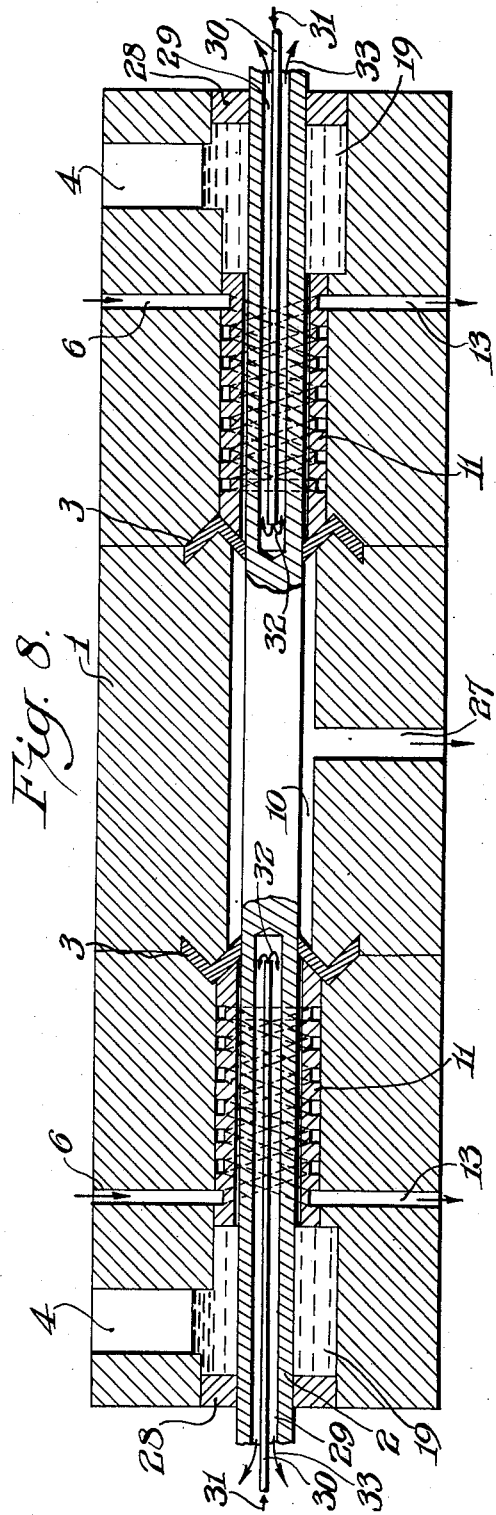
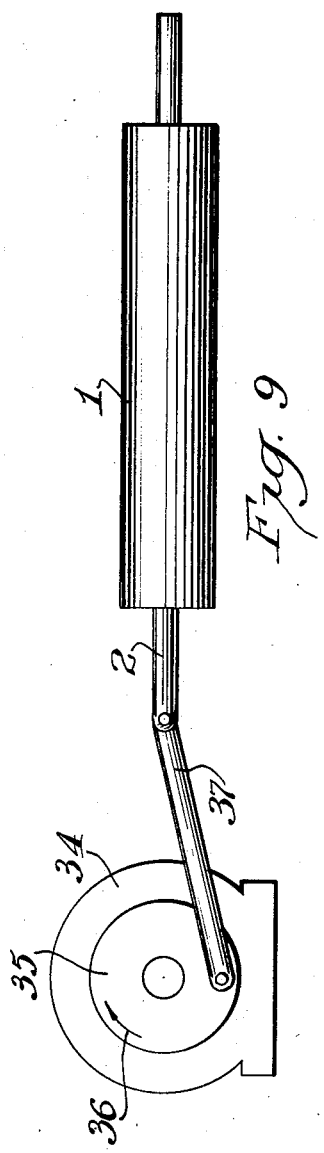
INVENTORS
Marcel Eugene Amblard
Richard Babington Winn
BY Earl L. Tyner, Jr.
ATTORNEY

United States Patent Office 2,795,195
Patented June 11, 1957

2,795,195
HIGH PRESSURE PUMPING METHOD

Marcel Eugene Amblard, Charleston, W. Va., and Richard Babington Winn, Warash, Southampton, England, assignors to E. I. du Pont de Nemours and Company, Wilmington, Del., a corporation of Delaware Application June 3, 1953, Serial No. 359,272

8 Claims. (Cl. 103—153)

This invention relates to a novel means for delivering small quantities of fluids at extremely high pressures, and more specifically it relates to a novel method for containing high fluid pressures by a seal around a reciprocating shaft.

As science and technology have advanced, it has become increasing apparent that new equipment has to be designed to meet the demands of these advances. Many new developments are only awaiting the appearance of a new metal or piece of equipment which can withstand high temperatures, high pressures, corrosion, or other similar physical and chemical occurrences. In the chemical industry new products are resulting from new processes which quite often must be operated at very high pressures, such as 2000 atmospheres or more. An immediate problem therefore is to provide a pump for generating such pressures and since a pump is made of relatively movable parts, one of the main problems is to provide some type of sealing mechanism which can contain the generated pressure.

It is an object of this invention to provide a novel method for sealing a reciprocating plunger shaft capable of producing and maintaining extremely high pressures. It is another object of this invention to provide a pumping device utilizing the herein described novel sealing arrangement. It is another object of this invention to provide a method for automatically lubricating and thus reducing the wear of seals for reciprocating shafts.

The above objects are attained by introducing a sealing fluid; for example, oil, glycerine, or other fluid with the proper viscosity characteristics, into a small radial clearance around the reciprocating shaft on the low pressure side of seal. If this small radial clearance is sufficiently long in an axial direction and the geometry of the clearance properly designed, an extremely high pressure will be developed at the seal. Proper design of the seal will permit such high pressure fluid to flow between the seal and the shaft, thus lubricating the seal and preventing excessive wear on that surface. Furthermore, by properly selecting a seal and its material of construction, the high pressure sealing fluid can be made to flow past the seal in one direction only, and thus to perform a pumping action at extremely high pressures, that is, in the order of 2000 atmospheres or more.

By reference to the attached drawings a more complete understanding of the method of this invention can be obtained. Figure 1 shows a diagrammatical picture of the method of this invention when utilizing a chevron seal. Figure 2 shows a partial view of the arrangement of Figure 1 wherein an O-ring seal with a backing ring has been substituted for the chevron seal. Figure 3 shows a partial view of the arrangement of Figure 1 wherein segmental metallic ring packing has been utilized in place of the chevron seal. Figures 4, 5 and 6 are enlarged views of the seals showing their action in the process of this invention. Figure 7 is a schematic view of the cooling system employed in this invention. Figure 8 is a schematic illustration of a double-acting pump formed by two of the devices shown in Figure 1 being placed in opposing relationship to each other and having a reciprocating shaft and an outlet common to both devices. Figure 9 is a schematic illustration of a suitable method for driving the pump shown in Figure 8.

Referring specifically to Figure 1, a reciprocating shaft 2 is surrounded by a suitable housing 1, for example, the shaft 2 may be the piston or plunger of a reciprocating pump. It is desirable to seal the plunger 2 against a process fluid or some other medium at 10, and for this purpose seal 3 is placed around, and in touching relationship with plunger 2. Since the constant friction at bearing surface 9 will soon cause seal 3 to become worn to such an extent that the usefulness of the seal disappears, it is generally desirable to lubricate surface 9 to decrease the friction, and subsequently the wear, at that point Sealing fluid is introduced at 4 for the purpose of lubricating surface 9. The sealing fluid is in general a lubricating substance such as an animal, vegetable or mineral oil, glycerine, or the like. As will be described later, the viscosity characteristics of the sealing fluid are important. The sealing fluid enters under atmospheric pressure at 4, forming a pool of fluid at 5. If the upper end of plunger 2 is not enclosed, entry 4 can be eliminated by supplying sealing fluid by gravity flow into chamber 19 from an outlet above. It may be advantageous to introduce fluid at 4 and to seal opening 19 with a low pressure mechanical seal to prevent loss of fluid or contamination from above. The fluid entering through 4 or 19 then will fill clearance 7, and by the pumping action described hereinafter, flow past surface 9 between the seal 3 and plunger 2, and be discharged at 10. Clearance 7 should be very small in radial distance, no greater than 0.0010 inch for most embodiments of this invention. As plunger 2 moves in the direction of sealing fluid flow, that is from 5 to 10, hereinafter called the downstream direction, sealing fluid at 5 is dragged along with plunger 2 through the clearance 7 and eventually reaches seal 3, building up a fluid pressure at 8 sufficient to cause seal 3 to lift slightly away from plunger 2 and allow some fluid to reach surface 9 and to be discharged into 10. On the opposite stroke of plunger 2, that is, in the direction from 10 to 5, hereinafter called the upstream direction, fluid at 10 is wiped off the surface of plunger 2 by the angle which seal 3 makes with plunger 2 and by the fact that pressure at 10 will cause seal 3 to fit more tightly against plunger 2 along surface 9. Fluid which had not passed seal 3 on the downstream stroke, that is the fluid at 5 and 7 will have a tendency to be dragged in the upstream direction. Because of the fact that clearance 7 is so small and that the sealing fluid is relatively viscous, the fluid in 7 cannot easily reverse its direction of flow. The maximum amount of upstream flow is some portion of the volume of clearance 7. Because of the small clearance at 7, the relatively large clearance at 10, and the configuration of seal 3, there is an uneven balance betwen forces generated by the downstream and upstream strokes of plunger 2, and this results in a pressure build-up at 8 which can be utilized to lubricate surface 9 and to pump sealing fluid into space 10. If suitable valving is utilized in the discharge lines downstream from 10, the method of this invention can be utilized to produce and deliver extremely high pressure fluid.

Figure 2 serves to show that an O-ring seal 14 with a backing ring 21 may be used in place of the chevron seal of Figure 1. Other than the seal and adapters for retaining this type of seal, the arrangement of Figure 1 is unchanged and the above description of how fluid lubricates surface 9 or is pumped into space 10 applies equally well to Figure 2.

In the same manner Figure 3 shows segmental metallic ring packing utilized in place of the chevron seal of Figure 1. The description applicable to Figure 1 is equally applicable to Figure 3. It is to be noted that corners 8 of the segmental packing are rounded or chamfered while the other corners adjacent to shaft 2 are sharply square, thus giving the advantage of forcing sealing fluid under the seal onto surface 9 on the downstream stroke but not on the upstroke. Figure 3 shows the usual application of two segmental packing rings in which the upstream ring 15 is the tangential ring, while the downstream ring 16 is the radial ring. Only the upstream corners 8 of the tangential ring 15 are rounded; the downstream corners of ring 15 and both corners of ring 16 are not rounded. A light spring 17 has been incorporated to hold the segmental packing rings against the upstream surface of the retainer groove 20. The spring 17 serves to overcome the force of gravity and not to work against the pressures developed by the sealing fluid in the operation of this invention.

The distinctive features of this invention are (1) the geometry of clearances 7 and 10, (2) the viscosity characteristics of the sealing fluid and the means for controlling the viscosity, and (3) the configuration of the seal at the surface of contact with plunger 2. In general, these three features are interrelated such that a change in one feature may necessitate a complementary change in the other two.

Taking these features in order, the geometry of clearances 7 and 10 must be such that on the downstroke of plunger 2 there is developed sufficient pressure to force some fluid between the seal and the plunger into clearance 10. At the same time the geometry must be such that on the upstroke of plunger 2 there will not be sufficient pressure developed to force fluid from clearance 10 past seal 3 to clearance 7. This uni-directional flow is accomplished in a general fashion by making the radial clearance at 10 larger than the radial clearance at 7, and by making the axial length of clearance 7 longer than the length of clearance 10. For a relatively viscous sealing fluid such as a hydrocarbon oil, glycerin, or the like, it has been found that clearance 7 may be in the order of 0.0010 inch in radial measurement. In other words, the diameter of the bore of jacket 11 may exceed the diameter of plunger 2 by as much as 0.0020 inch. This diameter may vary depending on the level of pressure to be developed by the fluid and the viscosity of the fluid under operating conditions. Smaller radial clearances are required for less viscous fluids and for the development of higher pressures.

The length of clearance 7 in an axial direction, that is from 18 to 8, is important in developing high pressure on the fluid. On the downstroke of plunger 2, fluid adhering to the surface of the plunger is dragged from 5 into clearance 7, toward seal 3. It may be advantageous in certain embodiments of this invention to taper corner 18 by rounding or flaring, although it is not necessary for the operation of this invention. The viscous fluid being dragged along with plunger 2 is piled up at 8 by the barrier of seal 3. This pile-up of fluid causes an increase in its pressure. If the length of clearance 7 is less than one-half the length of the stroke of plunger 2, the downstroke of plunger 2 will drag enough fluid on its surface to build up a very high pressure at 8, in the order of 2000 atmospheres or more. The absolute axial length of clearance 7 must however be sufficient to allow a pressure gradient to be present, varying from 1 atmosphere at 18 to highest developed pressure at 8, which may be greater than 2000 atmospheres. In general, as the length of clearance 7 is increased, the pressure developed at 8 is higher and higher. Thus the combination to produce high pressures in clearance 7 is to form a long, narrow clearance around plunger 2. Apparently, the sealing fluid being dragged along the surface of plunger 2 in the very narrow confinement of clearance 7 prevents the fluid from turning around at 8 and flowing upward along the inside surface of jacket 11. Thus, because of the friction forces and the narrow confinement in clearance 7, there is a build-up of pressure at 8. When the pressure reaches a high enough level the fluid will cause seal 3 to swing away from contact with plunger 2. The pressure at 8 forces the lip of the chevron seal in Figure 1 to swing away from plunger 2 as though the seal were hinged at 25. Figure 4 is a schematic drawing of the action of the chevron seal 3 under the pressure of fluid at 8, forcing surface 9 away from the surface of plunger 2 and allowing fluid to pass from 7 to 10.

In the same manner, Figure 5 shows the action of high pressure sealing fluid at 9, distorting the O-ring seal to allow fluid to pass from 7 to 10. Because of this high distortion of O-ring seals, there have been instances of where the O-ring was actually extruded out of its retainer into clearance 10 or clearance 7. To prevent occurrences of this nature with extremely high pressures, the modification shown in Figure 5 has been successfully employed. O-ring 14 is placed on the downstream side of backing ring 21 which stiffens the O-ring sufficiently to prevent extrusion of the seal into clearance 7 and helps to scrape the oil film off plunger 2 on its upstroke. Backing ring 21 may be made of any suitable flexible material such as leather, plastic, rubber or even metal. The groove for retaining the O-ring seal is specially designed to prevent the doughnut-shaped seal from being extruded through clearance 7 or 10. The configuration of the groove is shown in cross-section in Figure 5. The upstream half of the groove is shown at 22 is cylindrical in shape, the wall at 22 being substantially parallel to the axis of plunger 2. The downstream half of the groove as shown at 23 is conical in shape, the wall at 23 sloping away from plunger 2 as the wall extends downstream. The magnitude of the interior angle at 24 is not critical, about 60° being desirable in most cases. Figure 5 shows the action of this seal when plunger 2 is moving in the downstream direction as shown by the arrow on the plunger. At this moment, sealing fluid flows from clearance 7 to clearance 10. The backing ring 21 is bent away from plunger 2 by the pressure of sealing fluid in clearance 7, and O-ring seal 14 is forced away from plunger 2 by the same pressure. The undercut portion of the seal groove at 23 allows the O-ring to be forced back into angle 24 rather than to be extruded into clearance 10. On the upstream stroke of plunger 2, the seal 14 is pushed into the upper half of the seal groove at 22, the pressure of fluid in clearance 10 causing seal 14 to flatten somewhat and press against the surface of plunger 2, thus preventing fluid from flowing from clearance 10 to clearance 7. Backing ring 21 merely prevents seal 41 from extruding into clearance 7.

In Figure 6, the segmental metallic packing rings are shown expanded by the pressure of the fluid at 8. The rounded or chamfered corner at 8 aids the pressurized fluid in forcing these packing rings to expand away from plunger 2 sufficiently to allow fluid to pass into clearance 10.

On the upstroke of plunger 2, each of the seals of Figures 4, 5, and 6 swing back into place and assume the positions shown in Figures 1, 2 and 3. The upstroke tends to reverse the flow of sealing fluid in 7 and 10. By making clearance 10 relatively wide in a radial direction and short in an axial direction, the fluid in 10 during the upstroke of plunger 2 cannot develop the high pressures described above and cannot cause the seals to distort or swing open to allow fluid to flow from 10 to 7. Because the radial dimension of clearance 10 is large, the fluid clinging to the plunger or the upstroke can actually turn around at the seal and flow in the opposite direction along the surface of housing 1. This reversal of flow prevents any build up of pressure on the downstream side of the seal. The axial length of clearance 10 is made short for the same purpose, i. e., to prevent any undue confinement of fluid in 10 where the frictional drag forces on the fluid between two relatively moving surfaces such as would cause a build up of pressure in the fluid. The seals act similar to check valves in that they swing open with downstream flow and close with upstream flow.

It has been found that in the pumping of fluids such as oil, glycerine, etc., clearance 7 can be as large as 0.0010 inch radially and may be as small as 0.0001 inch. The axial length of clearance 7 should be no greater than one-half the stroke of plunger 2, but in any case, no less than about twice the diameter of plunger 2. At the same time clearance 10 has no minimum axial length other than that dictated by structural strength requirements. The maximum length of clearance 10 is difficult to determine although twice the diameter of plunger 2 is a satisfactory maximum limit for many applications of this invention. As a general rule, the length of clearance 10 ought to be less than half the length of clearance 7. The size of clearance 10 radially should be not less than twice the radial size of clearance 7. The maximum size of clearance 10 will be restricted by requirements for retaining the seal in place. In most embodiments, a radial dimension of 0.0020 inch will be satisfactory for clearance 10.

The sealing fluid utilized in this invention should have lubricating qualities and must have desirable viscosity characteristics. In general, the higher the viscosity of the fluid used, the higher will be the pressure developed at the seal. Suitable liquids include, but are not limited to, hydrocarbon, lubricating oils, glycols, glycerines, animal oils, vegetable oils and mineral oils. It has been found desirable that the fluid employed have viscosities of between 100 SUS (Saybolt Universal seconds) and 5000 SUS as the operating temperature. A preferred sealing fluid is a petroleum hydrocarbon lubricating oil which has a viscosity of 1360 SUS at 100° F. and one atmosphere and a viscosity of 103 SUS at 210° F. and one atmosphere.

As the pumping device of Figure 1 continues to operate, the friction of sealing fluid moving through clearance 7 develops sufficient heat to raise the temperature of the sealing fluid considerably. As the temperature of the sealing fluid rises its viscosity lowers, the result being that the pressure developed at seal 3 is materially reduced. To remedy this undesirable effect, jacket 11 is installed to remove the heat of friction. Figure 7 is a schematic view of jacket 11 showing the configuration of the cooling system. Jacket 11 as shown in Figure 7 is shown in less detail in each of the other figures of the drawings. Grooves 12 and 12a are spiral grooves running the full length of jacket 11, and these grooves are not connected to each other except by groove 26. Groove 26 is a single groove encircling jacket 11 at its lower extremity, i. e. the extremity adjacent to the seal of this invention whether it be chevron seal 3, O-ring seal 14, or France ring seals 15 and 16. Grooves 12 and 12a each terminate by intersection with groove 26. At the upper end of jacket 11, groove 12 is connected to the coolant inlet port 6 and groove 12a is connected to coolant outlet port 13. By means of this arrangement coolant enters through inlet port 6 and flows through spiral groove 12 down to groove 26 and thence back up spiral groove 12a to be discharged through outlet port 13.

In Figure 8 there is illustrated a means of forming a double-acting pump by combining two of the devices shown in Figure 1 around a shaft 2 and an outlet 27 which are common to both devices. It can be seen that as shaft 2 moves to the right, the left half of the device shown in Figure 8 is pumping fluid into outlet 27 while the right half of the device is not pumping fluid. When shaft 2 moves to the left, the right half of the device pumps fluid to the outlet 27 and the left half of the device does not pump fluid. Accordingly a double-acting pump is formed since on each stroke of the single shaft there is a pumping action. The only additional part needed to change two of the devices of Figure 1 to the one device of Figure 8 is a seal 28 to seal fluid in chamber 19 at each end of this device to prevent loss of fluid along shaft 2. Seal 28 does not have to be a high pressure seal since the fluid in chamber 19 is under atmospheric pressure only.

By regulating the speed of flow and the inlet temperature of the coolant, which may be water, the temperature of the sealing fluid in clearance 7 can be closely controlled. This means of temperature regulation permits the operator of this invention to maintain control of the viscosity of the sealing fluid, and thereby to control the pressure developed by the sealing fluid. A second cooling system may be utilized if needed, and may be installed by drilling a long hole 29 along the axis of plunger 2 and inserting a small tube 30 in the hole 29. Coolant may be introduced at 31 into the upper end of the tube 30 flowing downward and out the lower end 32 of the tube 30 and then flowing upward in the annulus around the tube 30 to be discharged at 33 at the upper end of plunger 2. Such a cooling system will aid in keeping the temperature low and the viscosity high as the sealing fluid is dragged along on the surface of plunger 2.

Figure 9 illustrates one of many ways of driving the pump of Figure 8 so as to produce a reciprocating motion for shaft 2. The device shown in this illustration includes a motor 34 delivering a rotational force to crank shaft 35 in the direction indicated by arrow 36. Crank shaft 35, in turn, transmits a reciprocating linear motion to pump shaft 2, by means of connecting rod 37. Other suitable devices may, of course, be employed to supply the same reciprocating linear motion to shaft 2.

The configuration of the seal is the third feature of this invention. In general, the seal should meet the surface of the plunger at an angle with the axis of the plunger. The angle should be such that a funnel-shaped construction is presented to the fluid flowing downstream. Thus, in Figure 1, as the fluid approaches the chevron seal it is directed toward point 8, next to the surface of plunger 2, by the sloping funnel-shaped surface of the seal. The fluid is jammed into the point of a V at the inner extremity of the seal causing the highest pressure to be at that point. When the pressure at that point has built up sufficiently high, it will force the chevron to pivot around corner 25, swinging open in a manner of a check valve to allow fluid to be carried into clearance 10.

On the upstroke of plunger 2, the reverse side of the seal is presented to the fluid being dragged along with the plunger. The fluid is directed to corner 25, away from plunger 2, thus causing a pressure build-up on the underneath side of the seal, forcing it to close and act as a doctor knife wiping fluid off the surface of plunger 2. Therefore, the configuration of the seal must be such that it directs fluid toward the plunger on the upstream side of the seal, and directs fluid away from the plunger on the downstream side of the seal. Figures 2 and 5 show the same configuration when the O-ring is used in place of the chevron seal. Figures 3 and 6 show the segmental metallic packing rings presenting a funnel-shaped appearance on the upstream side of the seal as evidenced by the rounded corner at 8. The downstream side of the seals presents a flat appearance, offering no inducement for the fluid to flow toward or away from the plunger, although the corner of the seal is relatively sharp giving it the ability to wipe fluid away from the surface of the plunger. An added force tending to close the seal of Figures 3 and 6 is that fluid is present around spring 17 and behind seals 15 and 16 exerting pressure radially inward toward the plunger, thus aiding in preventing the fluid from pushing upstream past the seals.

In the following table there are listed some of the results of utilizing various embodiments of the method of this invention.

| Run No. | Plunger Diameter (in.) | Radial Clearance (in.) | Length of Radial clearance (in.) | Type of Seal [1] | Number of Seals in Series | R. P. M. Plunger | Sealing Fluid | Pressure Delivered (p. s. i.) | Volume Delivered (cc./mm.) |
|---|---|---|---|---|---|---|---|---|---|
| 1 | 1.0 | 0.0009 | 1 | Chevron | 6 | 18 | Mineral Oil [2] | 17,000 | 0.36 |
| 2 | 1.0 | 0.0005 | 1 | ---do--- | 1 | 18 | ---do.[2] | 15,000 | 1.00 |
| 3 | 1.0 | 0.00025 | 1 | ---do--- | 1 | 18 | ---do.[2] | 14,000 | 0.75 |
| 4 | 1.0 | 0.00025 | 2¼ | ---do--- | 1 | 18 | ---do.[2] | 31,000 | 0.40 |
| 5 | 1.0 | 0.0005 | 2¼ | ---do--- | 1 | 18 | Glycerine | 30,000 | 0.42 |

[1] The seal in Run No. 1 was made of leather; the seals of Run Nos. 2-5 were made of "Teflon" tetrafluoroethylene resin ("Teflon" is a registered trademark of E. I. du Pont de Nemours & Co.).
[2] Mineral oil having viscosity of 1360 SUS at 100° F. and 103 SUS at 210° F., 1 atmosphere pressure.

It is to be noted that the combined features of this invention can be employed as a pump to deliver small amounts of viscous fluid at very high pressures. Examples of such utilization include a pump for delivering small amounts of catalyst into a high pressure chemical process, injecting lubricating oil into bearings carrying a heavy load, and other applications where it is desirable to deliver small volumes of liquid at pressures of 1000 atmospheres or more. By expanding the arrangement shown in Figures 1, 2, or 3, a double-acting pump can be formed. Thus, if the mirror image of Figure 1 is attached to the downstream portion of Figure 1 such that there would be a common plunger 2, a common housing 1, and a common discharge space 10, but all other features were doubled and placed in an opposing relationship to each other, or in other words, are symmetrical about an axis perpendicular to plunger 2 at some point downstream of seal 3, a double-acting pump would be present. The upstream stroke of one-half of the pump would be the downstream stroke of the other half of the pump. In this fashion the volume capacity of the double-acting pump would be twice that of the arrangement shown in Figure 1 although the pressure developed would be the same.

It has been customary in the past when sealing ordinary pressures, using a chevron type of seal, to use a number of identical seals, mating with one another in series. It has been found that in the arrangement and method of this invention one chevron seal does substantially the same job of developing pressure as six seals do, as shown in the table.

In order to illustrate the effect of lubricant viscosity on the wear-resistant qualities of a conventional six-unit chevron seal lubricated by drag flow, it has been found that changing the sealing fluid from ethylene glycol to glycerin, increased the life of the seal from 310 hours of operation to 1990 hours. In order to illustrate the effect of the length of the annulus on the pressure generated in a drop flow pump, tests have been carried out as shown in the table. A comparison of run Nos. 3 and 4 of the table shows that doubling the length of clearance 7 doubles the pressure developed by the fluid.

The materials with which the seal may be made vary from rubber to leather to plastic to metal. Many chevron seals are made of leather or of a treated or coated textile. O-rings are commonly made of rubber. Segmental packing is made of metal. Seals made of "Teflon" tetrafluoroethylene resin ("Teflon" is a registered trademark of E. I. du Pont de Nemours & Co.) or of various copolymers or modifications of polytetrafluoroethylene, may be desirable in certain embodiments of this invention because of the wear-resistant qualities of this synthetic resin.

It may be advantageous to alter certain operating conditions such that certain applications of this invention may be advantageously utilized. The sealing fluid of this invention normally enters through port 4 under a pressure of 1 or 2 atmospheres, or a pressure sufficient to keep a level of fluid at 5. Such conditions are satisfactory to produce pressures of 30,000 p. s. i. or more at the seal. However, it may be advantageous to utilize a higher pressure at 4 in certain applications of this invention.

The method of this invention may be used to inject fluid into a high pressure process, inject lubricant into a high pressure bearing or other piece of equipment requiring lubrication, to lubricate a seal on a reciprocating shaft, or to physically separate a high pressure process fluid from escaping around a reciprocating shaft in contact with the fluid. For example, a reciprocating shaft might extend from outside to inside a high pressure autoclave containing a fluid at 2000 atmospheres' pressure. Any of the seals disclosed herein could be placed around the shaft and a sealing fluid such as glycerin might be used. By adjusting the temperature and flow of coolant in jacket 11 of Figure 1, the glycerin in clearance 7 could be made to develop a pressure equaling or a shade less than the process pressure so that the process fluid could be sealed as well as lubricating the seal itself to prevent undue wear. By having the sealing fluid develop a pressure less than the process pressure, a little process fluid may leak past the seal. Such an arrangement prevents contamination of the process fluid but causes some contamination of the lubricant sealing fluid. The sealing fluid may be circulated in a stream in which impurities in the sealing fluid can be continuously removed; for example, by filtering, decanting or washing impurities away by a continuous flow of fresh sealing fluid. Other modifications of the method of this invention may be apparent to those skilled in the art, and it therefore is not meant to limit the scope of this invention other than by the following claims.

We claim:

1. An apparatus for producing high pressures on viscous fluids which comprises a housing having a central axial bore, an inlet port for supplying to said bore a viscous fluid under low pressure, and an outlet port for conducting away from said bore said viscous fluid under high pressure; a sleeve liner fitting into, and in fixed relationship with, the bore of said housing so as to form a smooth cylindrical bore of smaller diameter than the bore of said housing, a low pressure end of said bore being positioned adjacent the inlet port of said housing, a high pressure end of said bore being positioned adjacent the outlet port of said housing, said liner being provided with means for removing heat from its interior surface; a cylindrical plunger extending through the bore of said housing and through the bore of said liner and being in axially reciprocating relationship to said housing and said liner, the bore of said liner having a diameter which is not more than 0.002 inch in excess of the diameter of said plunger, the stroke of said plunger being at least twice the length of the bore of said liner; a flexible seal encircling and touching the entire circumference of said plunger, said seal being positioned at the high pressure end of the bore of said liner and in fixed relationship to said housing and said liner, the side of said seal which is adjacent said liner forming an acute angle at the point of contact with said plunger, and means for driving said plunger with an axially reciprocating motion.

2. The apparatus of claim 1 in which said seal is a chevron seal.

3. The apparatus of claim 1 in which said seal is a chevron seal made of polytetrafluoroethylene.

4. The apparatus of claim 1 in which said seal is a flexible O-ring seal.

5. The apparatus of claim 1 in which said seal comprises a tangential segmental metallic packing ring placed upstream and adjacent to a radial segmental metallic packing ring.

6. The apparatus of claim 1 in which the diameter of the bore of said liner exceeds the diameter of said plunger by not more than 0.001 inch, and the diameter of the bore of said housing on the downstream side of said seal exceeds the diameter of said plunger by not less than 0.002 inch.

7. A high-pressure, double-acting pump suitable for pumping viscous fluids which comprises a stationary housing having an axial bore, an inlet port at each end of said housing providing a passageway through which a viscous fluid at low pressure may be supplied to said bore from outside of said housing, an outlet port substantially midway between the two inlet ports and providing a passageway through which said viscous fluid at high pressure may be transmitted from said bore to the outside of said housing; two hollow cylindrical sleeve liners, one placed at each end of said bore with a low pressure end of said liner placed in contact with an inlet port and a high pressure end of said liner placed adjacent said outlet port, each of said liners being positioned in fixed relationship to said housing and having a continuous spiral groove on the outer surface of said liner connected to a first conduit through which a coolant may be introduced from outside of said housing into one end of said groove and a second conduit through which said coolant may be transmitted from the other end of said groove to the outside of said housing, each of said liners having a bore which is smaller in diameter than the bore of said housing; a plunger shaft extending through the bore of said housing and the bore of each liner in axially reciprocating relationship therewith, the diameter of the bore of each of said liners being not more than 0.001 inch in excess of the diameter of said plunger shaft, the stroke of said plunger shaft being at least twice the length of each of said liners; a flexible seal for fluids positioned at the high pressure end of each of said liners, said seal encircling, and circumferentially contacting, said plunger shaft in such a fashion that an acute angle is formed at all points of contact between the surface of said seal and the surface of said plunger shaft on the upstream side of said seal, said seal being in fixed relationship to said housing; and means for driving said shaft with an axially reciprocating motion.

8. The pump of claim 7 in which the diameter of the bore of said housing at all points between each of said seals is at least 0.002 inch in excess of the diameter of said plunger shaft.

References Cited in the file of this patent

UNITED STATES PATENTS

| | | |
|---|---|---|
| 2,554,234 | Baudry et al. | May 22, 1951 |
| 2,567,527 | Parks | Sept. 11, 1951 |
| 2,625,414 | Kranz | Jan. 13, 1953 |